Patented July 31, 1934

1,968,300

UNITED STATES PATENT OFFICE 1,968,300

METHOD OF MANUFACTURING AROMATIC CARBOXYLIC ACIDS

Lucas P. Kyrides, St. Louis, Mo., assignor, by mesne assignments, to Monsanto Chemical Company, a corporation of Delaware No Drawing. Application December 6, 1929, Serial No. 412,289

7 Claims. (Cl. 260—108)

This invention relates to the manufacture of aromatic acids of the benzoic acid class.

According to the present invention benzyl alcohol, or a material which is capable of reacting under the prevailing conditions to form the alcohol, is heated in an autoclave at elevated temperatures and pressures in the presence of a solution of caustic soda or other alkaline material whereby the alcohol is oxidized to the corresponding acid and may be recovered as the acid salt.

This process has the advantage over previous processes in that the product obtained is remarkably pure even though technical grades of benzyl alcohol are employed, moreover a variety of the aromatic acids may be prepared depending upon the raw material employed. Thus for example if benzyl alcohol is employed, benzoic acid results. On the other hand if the methyl derivative of benzyl alcohol is employed as a starting material, the corresponding methyl benzoic acid is formed.

According to one embodiment of the invention I mix 430 parts of benzyl alcohol with 355 parts of sodium hydroxide, dissolved in sufficient water to make about a 48% solution. The mixture is heated for approximately 7½ hours at a progressively increasing temperature changing from 250° to 280° C. Hydrogen is generated which is released from time to time in order to keep the pressure preferably at about 300-500 pounds per square inch. The gas so exhausted contains some benzyl alcohol and steam which can be condensed and recovered in the interest of economy. Following this procedure I have obtained yields varying from 80% to 90% of that theoretically possible. The unreacted alcohol is separated and may be added to a subsequent batch. The sodium benzoate so produced may be isolated by filtration and concentration or it may be converted into the acid by treating the sodium salt solution with a mineral acid such as sulphuric.

If desired starting materials other than the alcohol may be employed. Thus for example the benzyl alcohol may be substituted by benzyl chloride, in which case the caustic soda present probably hydrolizes the benzyl chloride first. In a like manner dibenzyl ether may be employed in lieu of the alcohol, as well as derivatives of the aromatic compounds whereby the corresponding aromatic acid is formed. Other caustic agents may be employed including potassium hydroxide which may be substituted wholly or in part for the sodium hydroxide. For the purpose of hydrolyzing the benzyl chloride to the alcohol, the soluble carbonates or lime may be employed and caused to react before the caustic is added.

The product which results from the procedure herein above set forth is remarkably pure and free from objectionable by-products. For many purposes the sodium salt of the acid is needed and may be used directly without converting the material to the acid and subsequently reacting with an alkali.

Obviously the conditions of the reactions may be varied within wide limits, as for example the amount of water or other suitable solvent may be increased or decreased. Similarly the amount of alcohol may be increased and used in excess instead of the caustic. In a like manner the temperature of the reaction may be varied and the pressure increased or decreased in order to change the rate of reaction as is well understood by those skilled in the art. Thus, although I have illustrated and described but a single specific embodiment of the principles of the invention it is to be understood that the invention is not so limited but broadly comprehends the reaction of an aromatic alcohol or a material capable of forming the alcohol under the prevailing conditions with a caustic material such as sodium hydroxide or potassium hydroxide or mixtures of these materials to form the acid body.

What I claim is:

1. In the manufacture of a phenyl carboxylic acid that step which comprises reacting the corresponding alcohol at elevated temperatures and pressures with a basic caustic alkali material in the presence of water.

2. A method of manufacturing benzoic acid which comprises subjecting benzyl alcohol to the action of an aqueous caustic alkali solution at elevated temperatures and pressures and liberating the acid formed.

3. That step in the manufacture of a benzoic acid that comprises subjecting a material selected from a group consisting of the corresponding alcohol, ether and chloride to the action of an aqueous caustic alkali at elevated temperatures and pressures.

4. The method of manufacturing benzoic acid which comprises subjecting benzyl alcohol to the action of sodium hydroxide in the presence of water and at a temperature above 250° C. and at elevated pressures and liberating the acid so formed.

5. In the manufacture of an alkali metal benzoate the steps of reacting the corresponding alcohol with a solution of a caustic alkali at elevated temperatures and pressures, filtering the solution of the alkali metal benzoic acid salt so formed and separating the same by evaporation and crystallization.

6. The method of manufacturing a benzoic acid which comprises reacting a material selected from a group consisting of a benzyl chloride, a benzyl alcohol, a benzyl ether with an aqueous solution of a caustic alkali at elevated temperatures and pressures and liberating the acid formed.

7. The method of oxidizing a benzyl alcohol which consists in heating benzyl alcohol with an aqueous solution of a caustic alkali, whereby hydrogen is liberated and an alkali metal salt of benzoic acid is formed.

LUCAS P. KYRIDES.